(12) United States Patent
Weiß et al.

(10) Patent No.: US 10,787,961 B2
(45) Date of Patent: Sep. 29, 2020

(54) SHIFTING GATE ARRANGEMENT AND METHOD FOR THE PRODUCTION THEREOF

(71) Applicant: Dr. Ing. h.c. F. Porsche Aktiengesellschaft, Stuttgart (DE)

(72) Inventors: Timo Weiß, Walheim (DE); Andreas Misala, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 44 days.

(21) Appl. No.: 15/811,762

(22) Filed: Nov. 14, 2017

(65) Prior Publication Data

US 2018/0142616 A1  May 24, 2018

(30) Foreign Application Priority Data

Nov. 18, 2016  (DE) .................. 10 2016 122 236

(51) Int. Cl.
| | |
|---|---|
| F02B 75/04 | (2006.01) |
| B23K 26/32 | (2014.01) |
| B23K 26/24 | (2014.01) |
| B24B 1/00 | (2006.01) |
| F16C 7/06 | (2006.01) |

(Continued)

(52) U.S. Cl.
CPC ............ F02B 75/045 (2013.01); B23K 26/24 (2013.01); B23K 26/32 (2013.01); B24B 1/00 (2013.01); F16C 7/06 (2013.01); B23K 2101/005 (2018.08); B23K 2101/006 (2018.08); B23K 2103/04 (2018.08)

(58) Field of Classification Search
CPC .......... F02D 15/02; F02B 75/045; F16C 7/06; F16C 23/10; F16C 2360/22; B23K 26/24
USPC ................................ 123/48 B, 195 C, 195 S
See application file for complete search history.

(56) References Cited

U.S. PATENT DOCUMENTS

| | | | | |
|---|---|---|---|---|
| 5,960,750 A | * | 10/1999 | Kreuter ................. | F02B 75/045 123/48 B |
| 8,485,606 B2 | * | 7/2013 | Geisler .................. | B23K 26/24 297/452.18 |
| 9,810,162 B2 | | 11/2017 | Paul | |

(Continued)

FOREIGN PATENT DOCUMENTS

| | | |
|---|---|---|
| CN | 106065812 A | 11/2016 |
| DE | 102005055199 A1 | 5/2007 |

(Continued)

OTHER PUBLICATIONS

Chinese Office Action for Chinese Application No. 201711129741. X, dated Aug. 21, 2019 with translation, 11 pages.

(Continued)

*Primary Examiner* — John Kwon
*Assistant Examiner* — Johnny H Hoang
(74) *Attorney, Agent, or Firm* — RatnerPrestia

(57) ABSTRACT

A shifting gate arrangement, and a method of production thereof, having shifting gates, which are adjustable in a spatial direction, for actuating connecting rod adjustment provisions, which are integrated in connecting rods, for the purpose of changing the length of the respective connecting rod. A sheet metal support frame is mounted so as to be displaceable to and fro in the one spatial direction. The shifting gates are fixedly connected to the support frame and are designed as a cast part or sintered part.

17 Claims, 3 Drawing Sheets

(51) Int. Cl.
    *B23K 103/04*     (2006.01)
    *B23K 101/00*     (2006.01)

(56) References Cited

U.S. PATENT DOCUMENTS

| | | | | |
|---|---|---|---|---|
| 2011/0048383 | A1* | 3/2011 | Pattakos | F02B 75/047 |
| | | | | 123/48 B |
| 2013/0247879 | A1* | 9/2013 | von Mayenburg | F02B 75/045 |
| | | | | 123/48 B |
| 2015/0260109 | A1* | 9/2015 | Wittek | F02B 75/045 |
| | | | | 123/48 B |
| 2015/0330298 | A1* | 11/2015 | Paul | F02B 75/045 |
| | | | | 123/48 B |

FOREIGN PATENT DOCUMENTS

| | | | |
|---|---|---|---|
| DE | 102010036773 | A1 | 2/2012 |
| DE | 102015109922 | A1 | 9/2016 |
| DE | 102015106315 | A1 | 10/2016 |
| EP | 3364010 | A1 | 8/2018 |
| WO | 2014019684 | A1 | 2/2014 |

OTHER PUBLICATIONS

Chinese Office Action for Chinese Application No. 201711129741X, dated Apr. 8, 2020 with translation, 16 pages.

\* cited by examiner

SHIFTING GATE ARRANGEMENT AND METHOD FOR THE PRODUCTION THEREOF

CROSS-REFERENCE TO RELATED APPLICATION

This application claims priority to German Patent Application No. 10 2016 122 236.4, filed Nov. 18, 2016, which is incorporated by reference herein in its entirety.

FIELD OF THE INVENTION

The invention relates to a shifting gate arrangement having shifting gates, which are adjustable in a spatial direction, for actuating connecting rod adjustment means, which are integrated in connecting rods, for the purpose of changing the length of the respective connecting rod. The invention furthermore relates to a method for producing a shifting gate arrangement of this type.

BACKGROUND OF THE INVENTION

Internal combustion engines, in particular those which are used in motor vehicles, are completely configured in such a manner that the length of the connecting rod assigned to the respective cylinder can be changed, and therefore the reciprocating piston engine can operate with a variable compression ratio during operation. In order to change the length of the respective connecting rod, and therefore the distance between the bearings of the respective connecting rod, firstly in the crankshaft and secondly in the piston, use is made of a shifting gate with which connecting rod adjustment means integrated in the connecting rod can be activated. By adjustment of the respective connecting rod adjustment means, depending on the selected technology, the length of the connecting rod is changed, for example by pivoting two parts of the connecting rod with respect to each other, wherein the one part is connected to the crankshaft and the other part is connected to the piston.

SUMMARY OF THE INVENTION

Described herein is a shifting gate arrangement of the type mentioned at the beginning in such a manner that said shifting gate arrangement is of particularly simple configuration structurally. Also disclosed is a simple method for producing a shifting gate arrangement of this type.

The shifting gate arrangement according to aspects of the invention therefore has shifting gates, which are adjustable in a spatial direction, for actuating connecting rod adjustment means, which are integrated in connecting rods, for the purpose of changing the length of the respective connecting rod. In this connection, a sheet metal support frame which is mounted so as to be displaceable to and fro in the one spatial direction is provided.

Furthermore, the shifting gates which are fixedly connected to the support frame are designed as a cast part or sintered part.

The shifting gate arrangement is therefore of multi-part design, wherein the support frame is composed of sheet metal, and the shifting gates are designed as cast parts or sintered parts. This makes it possible to produce said components which are relevant for the shifting gate arrangement in a particularly simple manner and to form the shifting gate arrangement therefrom. The support frame, as a supporting component, can thus be produced very simply from sheet metal, in particular by punching and embossing the sheet metal. The shifting gates, by contrast, which have the task of precisely carrying out the shifting of the connecting rod adjustment means integrated in the connecting rods can be formed in a particularly simple manner as a cast part or sintered part in respect of the basic configuration and formation of contours, in particular in the region of shifting surfaces of the shifting gates. It is then only required to position the shifting gates in a defined manner with respect to the support frame and to connect said shifting gates fixedly to the support frame.

The support frame is preferably composed of steel sheet. It can therefore firstly be particularly readily machined and secondly has high strength.

It is considered particularly advantageous with regard to the respective shifting gate if the latter is designed as a precision cast part, in particular as a steel precision cast part. As a cast part, the shifting gate therefore has exact gate contours for the purpose of actuating the connecting rod adjustment means and is moreover also formed from a highly stable material.

In particular, the support frame is of single-part design.

In order to ensure precise positioning of the respective shifting gate with respect to the support frame, it is provided, according to a preferred development of the invention, that the support frame is provided with at least one embossment for pre-positioning the respective shifting gate prior to its connection to the support frame. A single embossment can be sufficient if the latter has a particular shape which is sufficient for pre-positioning of the associated shifting gate, for example has a cross-shaped contour. The shifting gate is therefore not only pre-positioned in a plane with respect to a displacement movement, but also with respect to a rotational movement. When a plurality of embossments are used for the pre-positioning, the latter can be designed substantially more simply in order thereby to fix the associated shifting gate in two spatial directions.

According to a preferred development, it is provided that the support frame is provided with a plurality of embossments for pre-positioning the respective shifting gate prior to its connection to the support frame, wherein the respective embossment has a positive or negative projection for interacting with matching negative or positive projections of the associated shifting gate. The projections on the support frame are, for example, of cylindrical design.

It is considered particularly advantageous if the shifting gate is fixedly connected to the support frame by means of welded joints. Such a connection can be produced particularly simply and is a permanent connection, in particular from the aspect of transmitting the forces and/or vibrations introduced into the shifting gate during operation of the internal combustion engine.

The support frame is configured particularly simply structurally if it has two first frame portions which are arranged parallel to each other and run in the one spatial direction, and a plurality of second frame portions which are arranged transversely with respect to said first frame portions and are connected to the first frame portions. In this connection, the shifting gates are fixedly connected to the support frame in the region of the first frame portions. A support frame configured in such a manner requires only little material, and is therefore of relatively lightweight design, and therefore the mass of the support frame to be moved during the movement to and fro for the purpose of actuating the connecting rod adjustment means integrated in the connecting rods can be kept relatively small. In particular when the support frame is designed in the form of steel sheet, a sufficient strength and stability of the support frame is ensured even for this construction of the support frame.

According to a preferred development, it is provided that the support frame, in particular an attachment on one of the first frame portions of the support frame, has a form-fitting portion for engagement of an adjustment means for displacing the support frame. By this means, the forces for displacing the support frame for the purpose of actuating the connecting rod adjustment means can be introduced directly into the support frame. The movement of the adjustment means can therefore be transmitted in a virtually play-free manner to the support frame and, on account of the fixed connection of the shifting gates to the support frame, can be transmitted directly to the connecting rod 153 adjustment means.

From the aspect of the finishing machining of the shifting gates after the connection thereof to the support frame, it is considered particularly advantageous if the support frame has a receptacle for positioning the support frame in a machining position of the shifting gate. This receptacle is designed in particular as an elongate hole which extends in the spatial direction in which the support frame and therefore the shifting gates are adjustable. The one end of the elongated hole constitutes the stop or the zero point here for the machining of a first gate surface, and the elongated hole in the region of the other end constitutes a stop for the machining of a second gate surface of said shifting gate.

According to a preferred development of the invention, it is provided that the support frame is mounted in a stationary oil scraper arrangement in a manner displaceable in the spatial direction. The support frame is therefore mounted in a further functional part of the internal combustion engine, namely in the oil scraper arrangement. Said oil scraper arrangement has diverse oil scrapers in order to strip off oil from the connecting rods in the region of the crankshaft mounting thereof during operation of the internal combustion engine and to feed said oil to an oil sump or an oil pan.

The shifting gate arrangement according to aspects of the invention and the described developments are used in particular in an internal combustion engine which is designed as a boxer engine. In principle, any internal combustion engine which functions according to the reciprocating piston principle is suitable. The shifting gate arrangement is arranged here between the two rows of cylinders of the boxer engine. The support frame is substantially a flat punched plate.

The method for producing a shifting gate arrangement is characterized by the following method steps:
a. producing the support frame, which is formed from sheet metal, and producing the shifting gates by casting or sintering,
b. pre-positioning the shifting gates on the support frame,
c. welding the shifting gates to the support frame,
d. machining shifting surfaces of the respective shifting gates, said shifting surfaces being arranged parallel to a plane which is arranged perpendicularly to the first spatial direction.

In particular, it is provided that the support frame is produced from steel sheet, and the shifting gates are produced by means of precision casting, in particular by means of steel precision casting. Alternatively, it is proposed to produce the shifting gates by sintering. The shifting gates are designed, for example, as steel powder sintered parts.

Embossments for pre-positioning the shifting gates are preferably formed directly during the production of the support frame from sheet metal. Furthermore, pre-positioning regions with respect to the support frame are preferably directly formed during the production of the shifting gates by casting or sintering.

The shifting surfaces of the respective shifting gate are machined in particular by grinding. If, for example, the first spatial direction in which the shifting gates are adjustable is the spatial direction X, the shifting surfaces of the respective shifting gate are machined in planes which are arranged parallel to the Y-Z plane (spatial directions Y, Z).

Shifting gates and support frame are preferably welded by means of laser welding or electron beam welding.

BRIEF DESCRIPTION OF THE DRAWING

An exemplary embodiment of the invention for clarifying the shifting gate arrangement and the method for producing said shifting gate arrangement is illustrated in the drawing and explained in more detail in the description below. The invention is not restricted here to the exemplary embodiment described.

In the drawing.

DETAILED DESCRIPTION OF THE INVENTION

Figure 1:
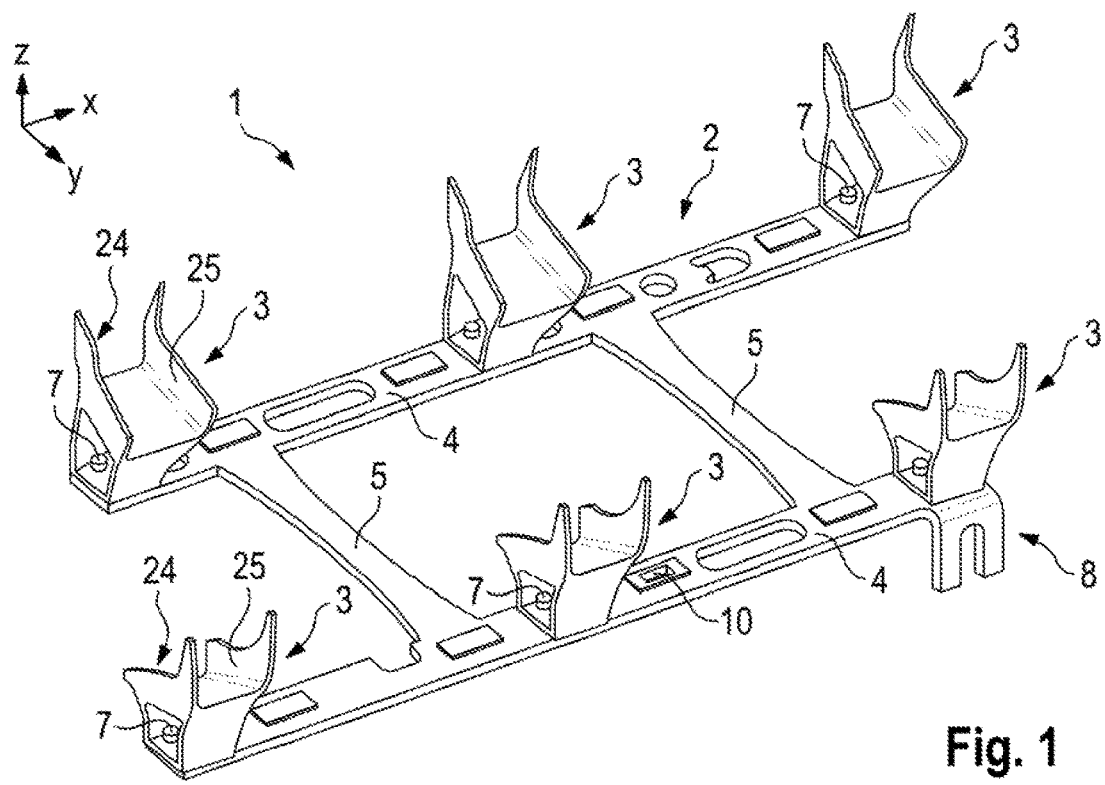
FIG. 1 shows the shifting gate arrangement in a three-dimensional illustration.
Figure 2:
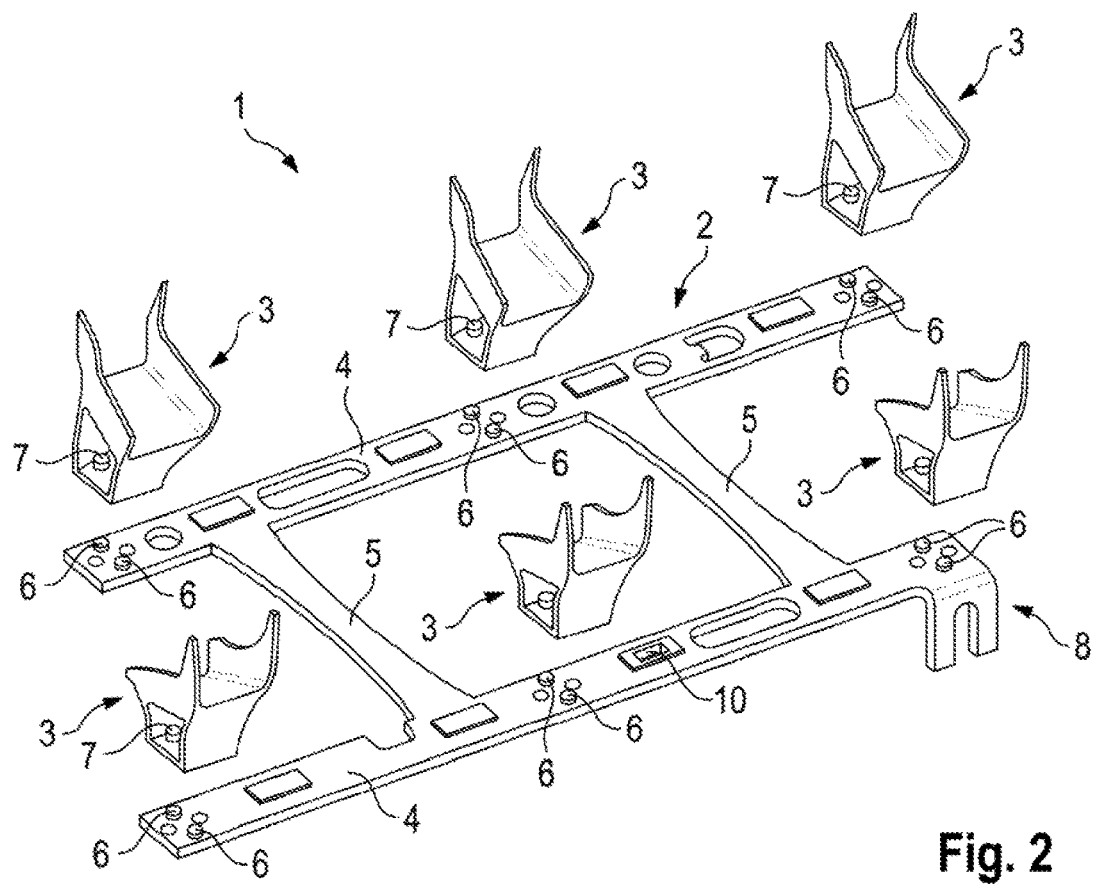
FIG. 2 shows the shifting gate arrangement according to FIG. 1 in an exploded illustration.

FIGS. 1 and 2 illustrate the shifting gate arrangement 1. The latter has a support frame 2 composed of steel sheet, and six shifting gates 3 composed of steel precision casting, which are fixedly connected to the support frame 2.

The support frame is designed as a punched part. It has two frame portions 4 which are arranged parallel to each other and run in a spatial direction X, and two frame portions 5 which run transversely with respect to said frame portions 4, specifically in the spatial direction Y, and are connected to the frame portions 4. The shifting gates 3 are fixedly connected to the support frame 2 in the region of the frame portions 4.

The three shifting gates 3 which are connected to the one frame portion 4 serve for shifting three connecting rods, which are assigned thereto, of a first row of cylinders of an internal combustion engine designed as a boxer engine, and the three shifting gates 3 which are connected to the other frame portion 4 serve for shifting three associated connecting rods of a second row of cylinders of the boxer engine. The latter is therefore a six-cylinder boxer engine.

It can be gathered in particular from the illustration of FIG. 2 that the support frame 2 has two embossments 6, which are designed as pin embossments, in the connecting region to the respective shifting gate 3, wherein the embossments 6 are arranged at a distance from each other. The embossments 6 therefore constitute elevations in relation to the support frame 2 in the Z direction and are spaced apart in the Y direction. For interaction of the respective shifting gate 3 with said embossments 6 on the support frame 2, the shifting gate 3 is provided with matching recesses 7, of which only one recess 7 can be seen in the respective shifting gate 3.

The respective shifting gate 3 is pre-positioned in the region of the embossments 6 and recesses 7, and then the shifting gate 3 is fixedly connected to the support frame 2 by laser welding.

The one of the two frame portions 4 is provided in the region of a free end with an attachment 8 of angled design during the production of the support frame 2. Said attachment is of U-shaped design and constitutes a form-fitting portion for the engagement of an adjustment means 9 (see FIG. 3). By means of said adjustment means 9, the support frame 2 and, accordingly, also the shifting gates 3 can be moved in the X direction and in the opposite direction thereto, for the purpose of changing the position of the shifting gates 3 in said spatial direction X and in the opposite direction thereto.

Said one frame portion 4 furthermore has a receptacle 10 for positioning the support frame 2 in a machining position of the shifting gates 3. Said receptacle 10 is designed as an elongated hole and constitutes the zero point for machining in the X direction.

Figure 3:
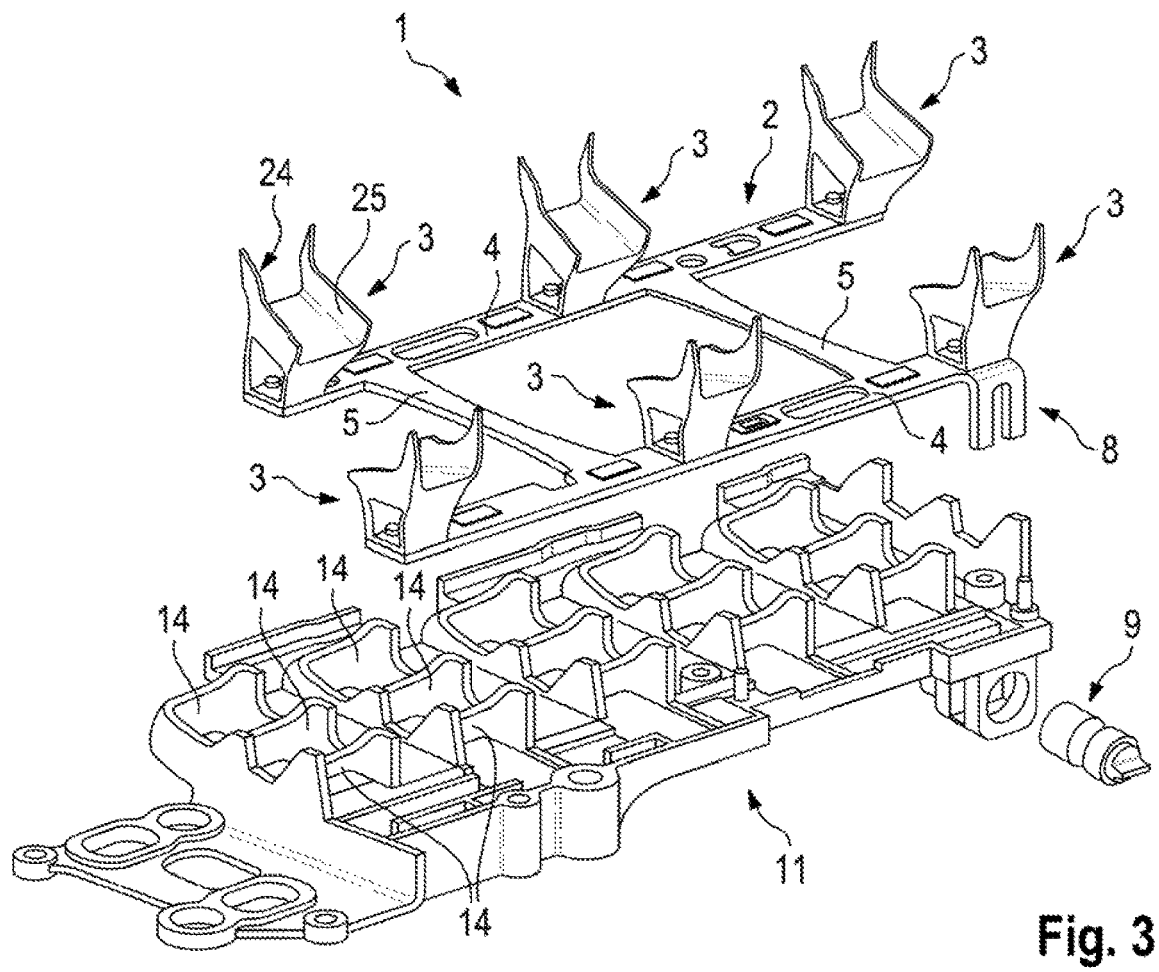
FIG. 3 shows the shifting gate arrangement according to FIG. 1 and an oil scraper arrangement, illustrated in an exploded illustration.
Figure 4:
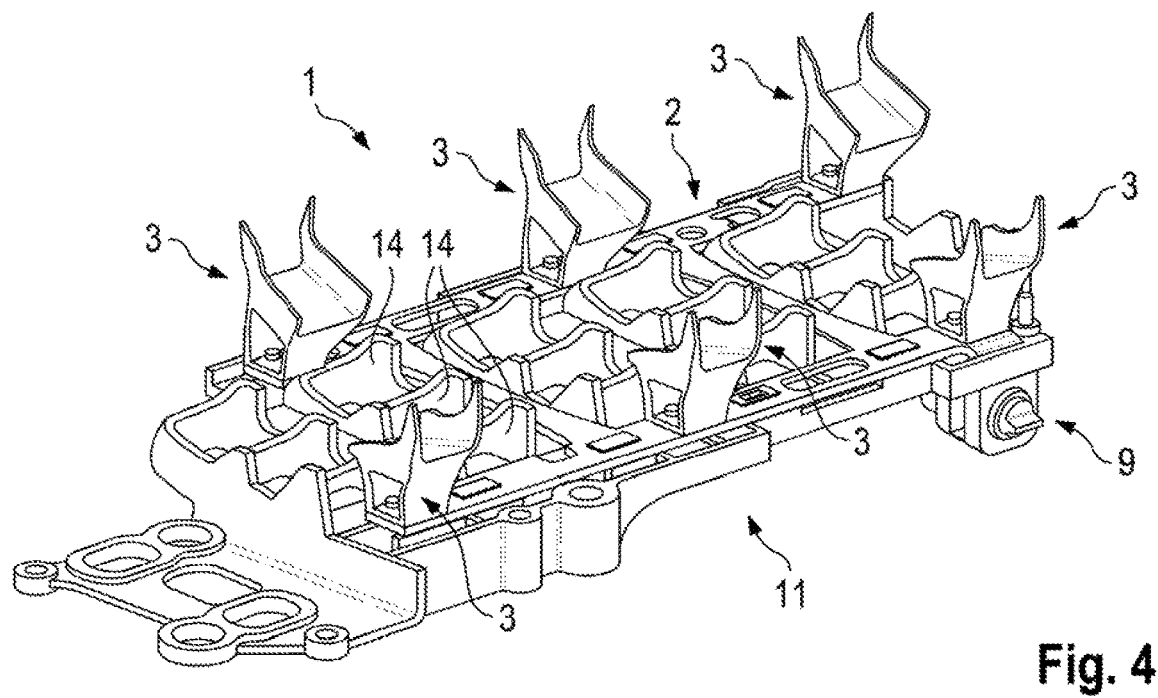
FIG. 4 shows the arrangement according to FIG. 3 in an assembled state.
Figure 5:
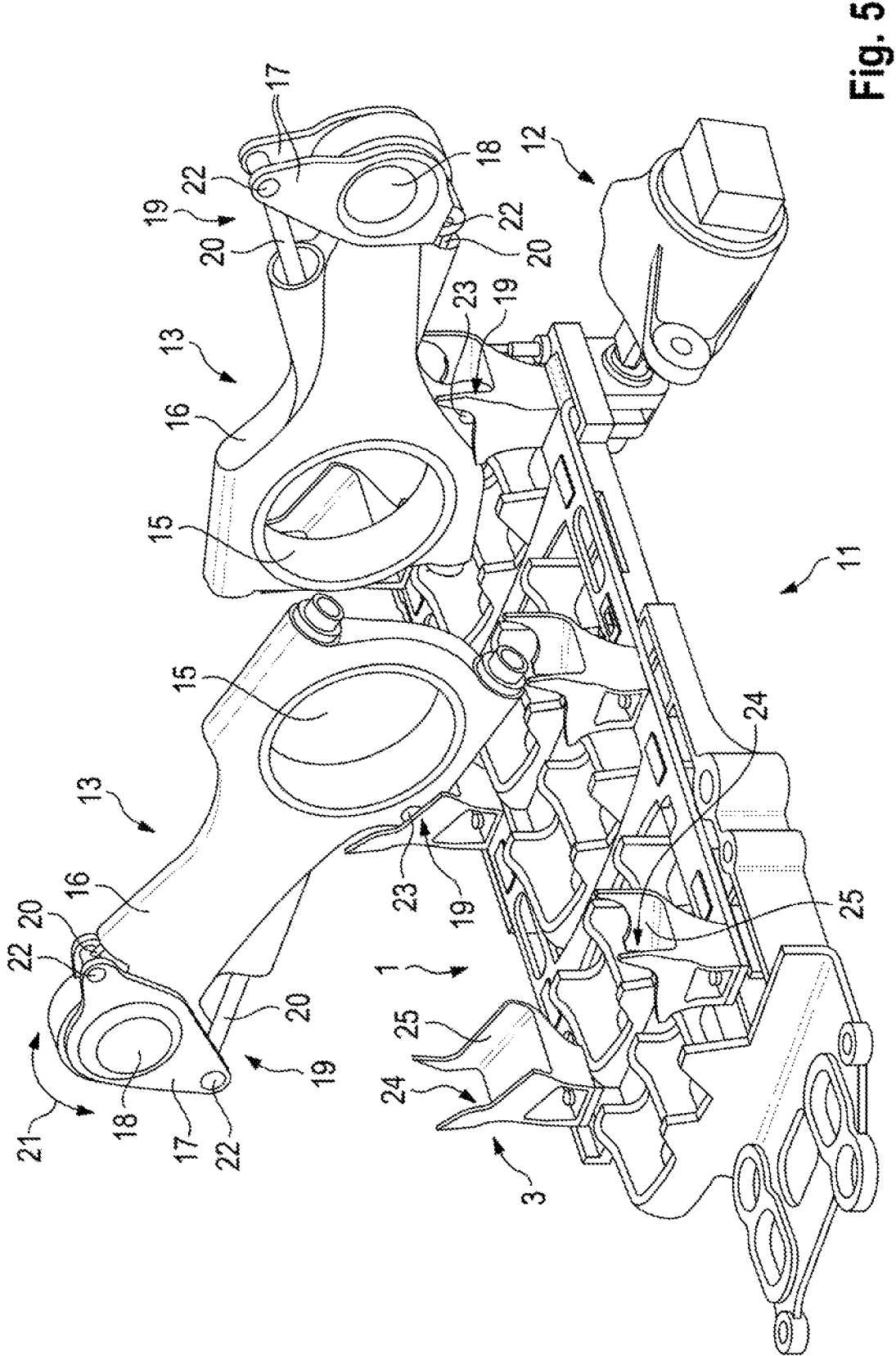
FIG. 5 shows the arrangement according to FIG. 4 with an additional illustration of a servo motor for displacing the support frame and two connecting rods, which are assigned to different cylinder blocks, of a boxer engine.

FIGS. 3, 4 and 5 illustrate the interaction of the shifting gate arrangement 1 with an oil scraper arrangement 11, furthermore of a servomotor 12 with the adjustment means 9, and also the arrangement of two connecting rods 13 which are assigned to cylinders of different rows of cylinders of the boxer engine and the length of which is adjustable.

The oil scraper arrangement 11 has a plurality of oil scrapers 14 per cylinder or per respective connecting rod 13, specifically three oil scrapers 14 per connecting rod 13, which are effective adjacent to a crankshaft-side connecting rod eye 15 of the connecting rod 13 and strip off excess oil located there from the connecting rod 13 and conduct the oil downward to an oil pan or an oil sump.

The shifting gate arrangement 1 is mounted in the oil scraper arrangement 11 and is displaceable with respect to the latter exclusively in the X direction, because of action via the servomotor 12.

As can be gathered from the illustration of FIG. 5, the respective connecting rod is of multi-part design, with a connecting rod portion 16 which has the large connecting rod eye 15, and also a connecting rod portion 17 which is mounted in said connecting rod portion 16 so as to be pivotable about an X axis and has a piston-side, eccentric, small connecting rod eye 18. An adjustment mechanism 19 with two adjustment rods 20 is effective between the two connecting rod portions 16 and 17. Said adjustment rods 20 are mounted in bearing axes 22 of the connecting rod portion 17 and are extendible out of the connecting rod portion 16. Part of the adjustment mechanism 19 furthermore forms a pin 23 which is arranged in the connecting rod portion 16 in the region of the connecting rod eye 15 and is displaceable to and fro in the X direction. Said pin 23 is movable to and fro by means of the associated shifting gate 3. For this purpose, the respective shifting gate 3 has a gate portion 24 and a gate portion 25. If the pin 23 makes contact with the gate portion 24, the pin 23 is displaced in the X direction because of the contour of the gate portion 24 and leads to a change in length of the connecting rod 13 in the one direction. If, by contrast, the support frame 2 is displaced counter to the X direction by means of the servomotor 12, the other gate portion 25 of the shifting gate 3 makes contact with the pin 23 and pushes the latter back again such that, as a result, the connecting rod length changes in the opposite direction.

Specifically, during the displacement of the pin 23 in the X direction, the one adjustment rod 20 is extended while the other adjustment rod 20 is at the same time retracted. During extension of the one adjustment rod 20, the connecting rod portion 17 is pivoted in the manner of a tilting lever and therefore so too is the eccentric connecting rod eye 18, such that the connecting rod length changes, for example becomes greater. If the pin 23 is displaced again counter to the X direction, this movement causes the other adjustment rod 20 to be hydraulically extended while the one adjustment rod 20 is retracted at the same time, and therefore the connecting rod portion 17 recedes and therefore so too does the eccentric connecting rod eye 18, and therefore the connecting rod length changes again in the opposite direction, and therefore, according to the example, is reduced. The pivoting directions of the connecting rod portion 17 are indicated with the double arrow 21.

The shifting gate arrangement 1 is produced as follows:

The support frame 2, which is formed from steel sheet, is produced during design of the embossments 6 for pre-positioning the shifting gates 3. Independently thereof, the shifting gates 3 are produced by steel precision casting, with the recesses 7 serving for the pre-positioning being formed in the shifting gates 3. The shifting gates 3 are then pre-positioned on the support frame 2. The shifting gates 3 are subsequently welded to the support frame 2 by means of laser welding. Machining then takes place, specifically the grinding of the gate portions 24 and 25, which have the function of shifting surfaces, of the shifting gates 3 that are arranged parallel to the Y-Z plane. The surfaces of the gate portions 24, 25 that are arranged parallel to the Y-Z plane are therefore machined after the laser welding. The receptacle 10 which is designed as an elongated hole is provided as a zero point for the machining in the X direction.

During the machining of the shifting gates 3 composed of the steel precision casting, a combination of calibration of the unfinished casting contour, said calibration being carried out in the region of the shifting surfaces 24, 25 during the production of the shifting gate 3, and finish machining of the partial surfaces by means of grinding is therefore provided.

LIST OF REFERENCE NUMBERS

1 Shifting gate arrangement
2 Support frame
3 Shifting gate
4 Frame portion
5 Frame portion
6 Embossment
7 Recess
8 Attachment
9 Adjustment means
10 Receptacle
11 Oil scraper arrangement
12 Servomotor
13 Connecting rod
14 Oil scraper
15 Large connecting rod eye
16 Connecting rod portion
17 Connecting rod portion
18 Small connecting rod eye
19 Adjustment mechanism
20 Adjustment rod
21 Pivoting directions
22 Bearing axis
23 Pin 24 Gate portion
25 Gate portion

What is claimed is:

1. A shifting gate arrangement comprising:
shifting gates, which are each adjustable for actuating an adjustment rod of a respective connecting rod and thereby consequently changing a length of the respective connecting rod,
wherein the shifting gates are fixedly connected to a support frame,
wherein the support frame is provided with a plurality of integral embossments for pre-positioning the respective shifting gate prior to welding the respective shift gate to the support frame, wherein the respective integral embossment has a positive projection for interacting with a matching negative projection of the respective shifting gate to limit axial or rotational displacement of the respective shifting gate on the support frame prior to welding the respective shift gate to the support frame,
wherein for each shifting gate, the negative projection of the shifting gate protrudes into a hollow portion of the shifting gate, and
wherein the shifting gates are fixedly connected to the support frame by welded joints.

2. The shifting gate arrangement as claimed in claim 1, wherein the support frame is composed of steel sheet.

3. The shifting gate arrangement as claimed in claim 1, wherein the respective shifting gate is a precision cast part, a steel precision cast part, a sintered part, or a steel powder sintered part.

4. The shifting gate arrangement as claimed in claim 1, wherein the support frame has two first frame portions which are arranged parallel to each other and run in the spatial direction, and a plurality of second frame portions which are arranged transversely with respect to said first frame portions and are connected to the first frame portions, wherein the shifting gates are fixedly connected to the support frame in the region of the first frame portions.

5. The shifting gate arrangement as claimed in claim 4, wherein an attachment on one of the first frame portions of the support frame has a form-fitting portion for engagement with an adjustment means for displacing the support frame, wherein the attachment on said one of the first frame portions is produced by deformation during production of the support frame.

6. The shifting gate arrangement as claimed in claim 1, wherein the support frame has a receptacle for positioning the support frame in a machining position of the shifting gates.

7. The shifting gate arrangement as claimed in claim 1, wherein the support frame is mounted in a stationary oil scraper arrangement in a manner displaceable in the direction.

8. The shifting gate arrangement as claimed in claim 1, wherein the shifting gates are a cast part or sintered part.

9. The shifting gate arrangement as claimed in claim 1, wherein each positive projection has a smaller diameter than the matching negative projection.

10. The shifting gate arrangement as claimed in claim 1, wherein each positive projection is a solid circular protrusion.

11. The shifting gate arrangement as claimed in claim 1, wherein the matching negative projections on each shifting gate are oriented to key the shifting gate on the positive projections of the support frame.

12. The shifting gate arrangement as claimed in claim 1, wherein each positive projection extends upwardly from a shifting gate mounting surface on the support frame toward a respective one of the shifting gates.

13. A method for producing a shifting gate arrangement for a motor vehicle, said method comprising:
a. producing a support frame from sheet metal,
b. producing shifting gates by either casting or sintering,
c. pre-positioning each of the shifting gates on the support frame by positioning integral embossments of the support frame, which are each provided in the form of a positive projection, within matching negative projections of a respective shifting gate to limit axial or rotational displacement of the respective shifting gate on the support frame prior to welding the respective shift gate to the support frame, wherein for each shifting gate, the negative projection of the shifting gate protrudes into a hollow portion of the shifting gate,
d. welding the shifting gates to the support frame,
e. machining shifting surfaces on the shifting gates, said shifting surfaces being arranged parallel in a plane which is arranged perpendicularly to a spatial direction in which the shifting gates are adjustable during operation.

14. The method as claimed in claim 13, wherein the support frame is produced from a steel sheet, and the shifting gates are produced from a precision casting, a steel precision casting, or are produced by sintering.

15. The method as claimed in claim 13, further comprising forming the embossments for pre-positioning the shifting gates during production of the support frame from the sheet metal.

16. The method as claimed in claim 13, wherein the shifting gates and the support frame are welded by laser welding.

17. The method as claimed in claim 13, wherein the shifting surfaces of the shifting gates are machined by grinding.

* * * * *